United States Patent Office.

ROBERT W. YOUNG, OF RISING SUN, INDIANA.

Letters Patent No. 114,246, dated April 25, 1871.

IMPROVEMENT IN COMPOSITION BLACKBOARDS.

The Schedule referred to in these Letters Patent and making part of the same.

*To all whom it may concern:*

Be it known that I, ROBERT W. YOUNG, of Rising Sun, Ohio county, State of Indiana, have invented a new and improved Composition Blackboard, of which the following is a full description.

My invention consists in compounding gum shellac, sandarac, mastic, asphaltum, linseed-oil, althea, cement, coal-ashes, black-drop, oxide of copper, and alcohol, so as to form a substance that is readily spread while warm with a brush or sponge upon paper, wood, or other surfaces, and, when dry, forms a black, hard, smooth surface.

To make and prepare the composition I take of gum shellac, twenty (20) parts; gum sandarac, twenty (20) parts; gum mastic, five (5) parts; gum asphaltum, eight (8) parts; linseed-oil, well boiled, four (4) parts; althea, six (6) parts; common cement, twenty (20) parts; coal-ashes, well burned, seventeen (17) parts.

Oxide of copper, one two-hundredth ($\frac{1}{200}$) part of the foregoing compound, or one-half pound to one hundred pounds of the compound.

I add a sufficient quantity of black-drop to give the required color, and alcohol sufficient to produce the proper consistency for use.

Mode of Making and Using.

The gums are placed in a common iron kettle, over just enough heat to melt the gums. The oil is then added, and the whole well stirred together. The cement, althea, and coal-ashes being well pulverized and mixed together are then added, with alcohol in small quantities, and the whole thoroughly stirred till it is brought to the required consistency for use.

The composition must be worked while warm, and may be applied on heavy paper, wooden, metallic, or other surfaces.

To use it on paper, the paper should first be prepared by a coat of asphaltum-varnish, well heated, to prevent the paper from separating when dry. A heavy coat of the composition is then applied with a brush, and then allowed to stand until it is sufficiently hardened not to stick to the roller under which it is passed to consolidate the material. When it is completely cooled and hardened, if the surface is not sufficiently smooth it is rendered so by rubbing it with pumice-stone.

The same process is used in applying the composition to metallic surfaces.

To apply it to wooden surfaces I use Venice turpentine instead of asphaltum-varnish.

Dry-wall surfaces are prepared for the composition by first coating them with hot asphaltum-varnish, which is allowed to become perfectly dry before the composition is applied.

The paper or metallic surfaces, prepared as described, are readily attached to a portable board or to walls, as may be required.

I claim—

The composition blackboard, of the ingredients in the proportions and for the purposes substantially as set forth.

In attestation of the foregoing specification of my improved combination blackboard and other purposes I hereunto subscribe my name this 18th day of February, 1871.

ROBERT W. YOUNG.

Witnesses:
   GEO. W. HARRYMAN,
   W. B. MILLER.